(12) United States Patent
Boiocchi et al.

(10) Patent No.: US 8,028,731 B2
(45) Date of Patent: Oct. 4, 2011

(54) TIRE FOR VEHICLES

(75) Inventors: Maurizio Boiocchi, Milan (IT);
Giuseppe Matrascia, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 231 days.

(21) Appl. No.: 10/585,068

(22) PCT Filed: Dec. 30, 2003

(86) PCT No.: PCT/IT03/00866
§ 371 (c)(1),
(2), (4) Date: Jun. 7, 2007

(87) PCT Pub. No.: WO2005/063508
PCT Pub. Date: Jul. 14, 2005

(65) Prior Publication Data
US 2007/0221304 A1    Sep. 27, 2007

(51) Int. Cl.
*B60C 11/00* (2006.01)
*B60C 11/03* (2006.01)
(52) U.S. Cl. ............... 152/209.1; 152/209.4; 152/209.5
(58) Field of Classification Search ............... 152/209.5, 152/209.4, 209.1
See application file for complete search history.

(56) References Cited

U.S. PATENT DOCUMENTS

| | | | |
|---|---|---|---|
| 3,406,733 A * | 10/1968 | Boileau | 152/542 |
| 4,044,811 A * | 8/1977 | Dudek et al. | 152/452 |
| 4,619,300 A | 10/1986 | Tokunaga et al. | |
| 5,006,603 A * | 4/1991 | Takaki et al. | 525/105 |
| 6,247,512 B1 | 6/2001 | Radulescu | |
| 6,598,645 B1 * | 7/2003 | Larson | 152/548 |

FOREIGN PATENT DOCUMENTS

| | | | |
|---|---|---|---|
| EP | 1 095 795 A1 | | 5/2001 |
| JP | 53080602 | * | 7/1978 |
| JP | 02249707 | * | 10/1990 |

(Continued)

OTHER PUBLICATIONS www.instron.us/wa/resourcecenter/glossaryterm.aspx?ID=160 &ref=http://www.google.com/search, 2009.*

(Continued)

*Primary Examiner* — Justin Fischer
(74) *Attorney, Agent, or Firm* — Finnegan, Henderson, Farabow, Garrett & Dunner, L.L.P.

(57) ABSTRACT

A pneumatic tire has a carcass structure having at least one carcass ply and at least one annular reinforcing structure associated with the carcass ply, a pair of axially opposite side walls on the carcass structure, a belt structure arranged at a radially outer position with respect to the carcass structure and a tread band arranged at a radially outer position with respect to the belt structure, and generally having a first elastomeric material incorporating at least one portion substantially of a second elastomeric material. The tread band has at least one groove defined in the at least one portion substantially of the second elastomeric material, wherein the ratio between the modulus of elasticity under compression at 100° C. of the second elastomeric material and the modulus of elasticity under compression at 100° C. of the first elastomeric material is not lower than about 1.30, and wherein the ratio between the IRHD hardness at 100° C. of the second elastomeric material, measured in accordance with standard ISO 48, and the IRHD hardness at 100° C. of the first elastomeric material, measured in accordance with standard ISO 48, is lower than about 1.10.

34 Claims, 3 Drawing Sheets

FOREIGN PATENT DOCUMENTS

| | | |
|---|---|---|
| JP | 2002-307911 | 10/2002 |
| WO | WO 01/03954 A1 | 1/2001 |

OTHER PUBLICATIONS

Giannelis, et al., "Polymer-Silicate Nanocomposites: Model Systems for Confined Polymers and Polymer Brushes", Advances in Polymer Science, vol. 138, (1999), pp. 107-147.

Translation of JP 02-249707, 1990.

Khairi Nagdi; Manale Della Gomma; Tecniche Nuove; Italian edition 1987, Vogel-Verlag, Würzburg; pp. 229-234.

English-language translation of the third full paragraph of p. 234 of the textbook entitled Manuale Della Gomma, Tecniche Nuove, 1987.

Translation of JP 02-249707.

Patent Abstract of Japan for JP 2002-307911, 2002.

Machine-generated translation of JP 2002-307911, 2002.

Japanese Office Action dated Oct. 21, 2009 for related Patent Application No. 2005-512778.

Patent Abstract of Japan for JP 2002-307911.

Machine-generated translation of JP 2002-307911.

Translation of Japanese Office Action dated Oct. 21, 2009.

\* cited by examiner

TIRE FOR VEHICLES

CROSS REFERENCE TO RELATED APPLICATION

This application is a national phase application based on PCT/IT2003/000866, filed Dec. 30, 2003, the content of which is incorporated herein by reference.

BACKGROUND OF THE INVENTION

The present invention refers to a pneumatic tire for two-wheeled or four-wheeled vehicles and in particular, but not exclusively, to a pneumatic tire for motorvehicles of the so-called UHP (Ultra High Performance) type.

Specifically, the present invention refers to a pneumatic tire comprising a carcass structure having at least one carcass ply, and at least one annular reinforcing structure associated to the carcass ply, a tread band made of an elastomeric material at a radially outer position with respect to the carcass structure, a belt structure interposed between the carcass structure and the tread band and a pair of axially opposite sidewalls on the carcass structure, wherein the tread band is provided with a pattern comprising one or more longitudinal and/or transversal grooves.

Within the framework of the present description, such a type of pneumatic tire shall be indicated with the term: grooved tire.

PRIOR ART

In the field of grooved tires for vehicles and in particular in the field of grooved tires for so-called UHP vehicles, one of the requirements which is most difficult to satisfy is that of limiting the degradation of the road holding characteristics and of the handling characteristics of the pneumatic tire, in particular of those related to the drift behavior, which inevitably arise with the use of the tire itself.

In grooved tires, this problem is substantially triggered by the fact that a tread pattern provided with grooves makes the pneumatic tire more yielding under the ground contacting area if the tire is subjected to shear stresses, such as for example the transversal shear stresses which are generated on a pneumatic tire when drifting, braking or accelerating.

The ensuing local deformations, in fact, produce as a consequence of the hysteresis of the elastomeric material which constitutes the tread band, a local temperature increase of the material which alters its chemical-physical characteristics with an irreversible degradation of its mechanical characteristics. This degradation penalizes in turn to an ever greater degree the performances of the pneumatic tire, above all its drift behavior, in particular when it is subjected to high thermal-mechanical stresses, such as for example in cases of so-called "boundary" driving, not infrequent in the case of UHP pneumatic tires.

It has been attempted in the art to satisfy the aforementioned requirement by trying to stiffen the portions of tread band defined between the grooves (ribs or blocks) or by acting upon the geometry of the grooves, for example by inclining the walls thereof (operation known as "bracing"), or else by adopting tread bands comprising overlapping layers, known as "cap and base", wherein the radially inner layer consists of a more rigid elastomeric material. See, for example, document WO 01/03954 in the name of the Applicant.

Alternatively, it has also been proposed—in the field of pneumatic tires for motorcycles—to improve the cornering and thus drift characteristics of the pneumatic tire by providing a tread band substantially consisting of a plurality of axially adjacent sectors and having an equatorial portion having a lower hardness and a greater tan δ with respect to those of opposite shoulder portions of the tread band itself. A solution of this kind was, for example, suggested by Japanese patent application published under no. JP07-108805.

These known pneumatic tire constructions, however, did not allow to entirely solve the problem of performance degradation of the grooved tires related to the mobility of the tread pattern under the ground contacting area, in particular of the tires of the so-called UHP type.

PROBLEM UNDERLYING THE INVENTION

The present invention has the object of providing a grooved tire for two-wheeled or four-wheeled vehicles which is capable to achieve improved performances in terms of road holding and handling, in particular of those performances related to the tire behavior when drifting, braking or accelerating.

SUMMARY OF THE INVENTION

According to a first aspect of the invention, this object is achieved by a pneumatic tire as defined in the attached claim 1.

The Applicant has, in particular, found that in order to achieve the desired improved characteristics of road holding and handling and, more particularly, of drift behavior of the pneumatic tire, it is necessary to suitably stiffen the elastomeric material which surrounds the side walls of the grooves so as to render the tread band portions defined by consecutive grooves less prone to the deformations ensuing from the stresses to which the pneumatic tire is subjected to during travel, for example the transversal stresses when cornering or the longitudinal stresses when accelerating or braking.

More specifically, the Applicant has found that the aforementioned object can be achieved by a pneumatic tire provided with a tread band generally consisting of a first elastomeric material incorporating at least one portion substantially consisting of a second elastomeric material, wherein:

i) the tread band comprises at least one groove defined in said at least one portion substantially consisting of the second elastomeric material;

ii) the ratio between the modulus of elasticity E' under compression at 100° C. of the second elastomeric material and the modulus of elasticity E' under compression at 100° C. of the first elastomeric material is not lower than about 1.30; and iii) the ratio between the IRHD hardness at 100° C. of the second elastomeric material, measured in accordance with standard ISO 48, and the IRHD hardness at 100° C. of the first elastomeric material, measured in accordance with standard ISO 48, is lower than about 1.10.

It should be specified herein that in the present description and in the subsequent claims, the term "elastomeric material" is used to indicate a composition comprising at least one diene elastomeric polymer and at least one reinforcing filler, such as carbon black and/or silica. Preferably, such a composition also comprises additives such as, for example, a cross-linking agent and/or a plasticizer. Thanks to the presence of the cross-linking agent, such a material may be cross-linked by heating, so as to form the end product.

In the present description and in the subsequent claims, moreover, the values of the modulus of elasticity E' under compression, as well as those of the loss modulus E" are intended to be measured by means of conventional apparatuses known per se by submitting a cylindrical test piece of vulcanized elastomeric material having a length of 25 mm and a diameter of 14 mm, subjected to compression preloading up to a longitudinal deformation of 25% of its original height and kept at a temperature of 100° C., to a dynamic sinusoidal deformation of a maximum width of ±3.50% of the height under preloading, with a frequency of 100 cycles per second (100 Hz).

The Applicant, while not wishing to be bound by any interpretative theory, observes that by forming the groove or grooves of the tread pattern in a portion of the tread band substantially consisting of an elastomeric material having a stiffness under heat (related to the values of the modulus of elasticity E' under compression at 100° C.) which is at least 30% greater than the stiffness under heat of the elastomeric material which constitutes the rest of the tread band and having, at the same time, a hardness under heat (related to values of IRHD hardness at 100° C.) which does not exceed by more than 10% the hardness under heat of the elastomeric material which constitutes the rest of the tread band, it is possible to achieve a pneumatic tire structure provided with both a suitable degree of resistance to shear deformations at the grooves, and suitable wear characteristics.

The portion(s) of the second elastomeric material which surround the side walls of the grooves, mechanically more rigid, are in fact able to effectively oppose the deforming action of the stresses to which the portions of elastomeric material defined between successive grooves (both along the axial and along the circumferential directions) are subjected when cornering, when accelerating or when braking.

In this way, it is advantageously possible to significantly reduce the entity of the deformation which the side walls of the grooves formed in the tread band and the portions of elastomeric material defined between consecutive grooves (along the axial and/or circumferential directions) are subjected to when the vehicle follows a curvilinear trajectory, brakes or accelerates.

This advantageous technical effect is also achieved without significantly penalizing the performances of the pneumatic tire in terms of wear, which is totally comparable to that of known pneumatic tires with the same tread pattern, thanks to the reduced difference between the hardness under heat of the aforementioned first and second elastomeric materials.

Preferably the ratio between the modulus of elasticity E' under compression at 100° C. of the second elastomeric material and the modulus of elasticity E' under compression at 100° C. of the first elastomeric material is comprised between about 1.30 and about 1.50.

In this way, it has advantageously been possible to achieve an optimal mechanical reinforcing action of the side walls of the grooves along with a further improvement of the resistance to the shear stresses which the portions of elastomeric material of the tread band are subjected to during movement of the pneumatic tire along a bend or in mixed paths, or else in acceleration and braking.

Preferably and in order to achieve the aforementioned ratios, the modulus of elasticity E' under compression at 100° C. of the first elastomeric material is comprised between about 4 and about 8 MPa, whereas the modulus of elasticity E' under compression at 100° C. of said second elastomeric material is comprised between about 6 and about 12 MPa.

By observing the aforementioned values of the modulus of elasticity under compression E' at 100° C. of the second elastomeric material, it has been found that it is advantageously possible to achieve an optimal stiffness of the side walls of the groove(s) formed in the tread band, so as to substantially reduce the deformations of the elastomeric material when cornering, when braking or accelerating.

In a preferred embodiment of the invention, the ratio between the IRHD hardness at 100° C. of the second elastomeric material, measured in accordance with standard ISO 48, and the IRHD hardness at 100° C. of the first elastomeric material, measured in accordance with standard ISO 48, is comprised between about 1 and about 1.05.

In this way, it is advantageously possible to achieve an optimal compromise between the performances in terms of road holding and handling of the pneumatic tire related to a suitable stiffness of the side walls of the groove(s) formed in the tread band, and the performance of the pneumatic tire in terms of wear.

By keeping the difference between the hardness under heat of the two elastomeric materials within suitably narrow limits, in fact, it is advantageously possible to reduce to the minimum the occurrence of phenomena of irregular wear of the tread band, in particular at the interface between the second elastomeric material in which the grooves are formed and the first elastomeric material which, on the other hand, constitutes the remaining parts of the tread band.

Preferably and in order to achieve the aforementioned ratios, the IRHD hardness at 100° C. of the first and of the second elastomeric materials, measured in accordance with standard ISO 48, is comprised between about 50 and about 70.

Advantageously, this preferred feature allows to achieve optimal characteristics of resistance to wear of the tread band avoiding phenomena of irregular wear.

In a preferred embodiment of the invention, the ratio between the Mooney viscosity ML (1+4) at 100° C. of the second unvulcanized elastomeric material, measured in accordance with standard ASTM D5289, and the Mooney viscosity ML (1+4) at 100° C. of the first unvulcanized elastomeric material, measured in accordance with standard ASTM D5289, is comprised between about 1 and about 1.10.

In this way the unvulcanized elastomeric materials are Theologically compatible with each other, for which reason it is advantageously possible to obtain by extrusion the tread band with a substantial absence of undesired detachment phenomena between the portions of tread band made of the first and of the second elastomeric materials.

Still more preferably, the ratio between the Mooney viscosity ML (1+4) at 100° C. of the second unvulcanized elastomeric material, measured in accordance with standard ASTM D5289, and the Mooney viscosity ML (1+4) at 100° C. of the first unvulcanized elastomeric material, measured in accordance with standard ASTM D5289, is comprised between about 1 and about 1.02.

Preferably and in order to achieve the aforementioned ratios, the Mooney viscosity ML (1+4) at 100° C. of the first and second unvulcanized elastomeric materials, measured in accordance with standard ASTM D5289, is comprised between about 50 and about 60.

Within the framework of the invention, the desired mechanical characteristics and hardness under heat of the first and, in particular, of the second elastomeric materials, can be achieved by suitably formulating the ingredients of these materials, with methods known per se to those skilled in the art.

In a preferred embodiment of the invention, the desired mechanical characteristics and hardness characteristics under heat of the second elastomeric material can be achieved by reinforcing such a material with a specific reinforcing material preferably having characteristics capable to increase the modulus of elasticity E' under compression without also significantly increasing hardness.

Within the framework of this preferred embodiment, the second elastomeric material thus comprises at least one diene elastomeric polymer reinforced with at least one reinforcing material dispersed therein and selected from layered inorganic materials, short fibrillated fibers of polyamide materials and mixtures thereof.

The Applicant, in fact, has found that by using these reinforcing materials it is advantageously possible to increase the stiffness characteristics of the second elastomeric material which surrounds the grooves formed in the tread band without significantly altering the other mechanical characteristics of the elastomeric material, in particular the hardness.

In a particularly preferred embodiment, the first and second elastomeric materials comprise respective diene elastomeric polymers having substantially the same mechanical characteristics and, still more preferably, substantially the same composition, and possess the aforementioned different characteristics of stiffness and hardness under heat due to the reinforcement of the second elastomeric material carried achieved by the aforementioned reinforcing materials.

According to a first preferred embodiment, the aforementioned layered inorganic materials consist of layered inorganic materials capable to form in situ reinforcing nanoparticles in the elastomeric material, known by the term of: nanocomposites. More information about the morphology and the characteristics of these inorganic materials can be found, for example, in: "*Polymer-Silicate Nanocomposites: Model Systems for Confined Polymers and Polymer Brushes*", E. P. Giannelis, R. Krishnamoorti, E. Manias, Advances in Polymer Science (1999), Vol. 138, Springer-Verlag, Berlin, Heidelberg, pg. 107-147.

Preferably, said at least one layered inorganic material has an individual layer thickness comprised between 0.01 nm and 30 nm.

The structure of the layered inorganic material can be determined by using X-ray diffraction (XRD) or transmission electron microscopy (TEM).

In a preferred embodiment, said layered inorganic material displays, in the second elastomeric material, a d-spacing value in X-ray diffraction analysis of at least 10% higher, preferably of at least 20% higher, with respect to the d-spacing value of the layered inorganic material before dispersing the same into the diene elastomeric polymer.

For the purposes of the invention, the variation (%) of the d-spacing values in X-ray diffraction analysis were calculated as follows. The analysis was carried out by inserting the test sample in a Philips Xpert diffractometer, employing analysis radiation of the CuKα type. The data were obtained with a step of 0.04°2θ and a count of 6 seconds per step in the range 1.4°2θ-32.0°2θ. The d-spacing value was calculated using the following formula:

$$d\text{-spacing} = \lambda/2 \, sen \, \theta$$

wherein λ is the wavelength of the kα radiation of Cu (average of kα1 and kα2) equal to 1.54178 Å.

The d-spacing value corresponds to the value of the distance between the crystal planes of the layered inorganic material in the second elastomeric material, in particular said value is the average distance between the corresponding surfaces of contiguous layers of the layered inorganic material. The effective distance between the continuous layers is obtained by subtracting the thickness of the individual layer from the d-spacing value.

In a preferred embodiment, the second elastomeric material comprises from 1 to 80 parts by weight, still more preferably from 5 to 40 parts by weight, of said at least one layered inorganic material per 100 parts by weight of diene elastomeric polymer.

Within the framework of the present description and in the subsequent claims, the parts by weight of a given component of a certain elastomeric material per 100 parts by weight of the diene elastomeric polymer of such a material shall also be indicated with the term: phr.

Within the framework of this preferred embodiment, the layered inorganic material can be selected, for example, among phyllosilicates such as: smectites, for example, montmorillonite, nontronite, beidellite, volkonskoite, hectorite, saponite, sauconite; vermiculite; halloisite; sericite; or mixtures thereof. Montmorillonite is particularly preferred.

In order to make the layered inorganic material more compatible with the diene elastomeric polymer such a layered inorganic material may be surface-treated with a compatibilizer.

Preferably, this compatibilizer may be selected, for example, from the quaternary ammonium or phosphonium salts having general formula (I):

wherein:

Y represents N or P;

$R_1$, $R_2$, $R_3$ and $R_4$, which can be identical or different, represent a linear or branched alkyl or hydroxyalkyl group having from 1 to 20 carbon atoms; a linear or branched alkenyl or hydroxyalkenyl group having from 1 to 20 carbon atoms; a R5-SH or R5-NH group wherein R5 represents a linear or branched alkylene group having from 1 to 20 carbon atoms; an aryl group having from 6 to 18 carbon atoms; an arylalkyl or an alkylaryl group having from 7 to 20 carbon atoms; a cycloalkyl group having from 5 to 18 carbon atoms, said cycloalkyl group possibly containing heteroatoms such as oxygen, nitrogen or sulfur;

$X^{n-}$ is an anion such as the chlorine ion, the sulfate ion or the phosphate ion;

n is 1, 2 or 3.

An example of a layered inorganic material that can be used according to the present invention is the product available on the market with the name Dellite® 67G from Laviosa Chimica Mineraria S.p.A.

According to a second preferred embodiment, the aforementioned reinforcing materials consisting of short fibrillated fibers of polyamide materials are represented, for example, by so-called aramide paste (short fibrillated fibers of poly-paraphenylene-terephthalamide), of the type commercially known as "Kevlar®-pulp" or "Twaron®-pulp" (Kevlar and Twaron are registered trademarks of DuPont and Akzo, respectively).

Preferably, such short fibrillated fibers are incorporated in the diene elastomeric material in an amount comprised between about 1 and about 80 phr and still more preferably between about 5 and about 40 phr, preferably having a length comprised between 0.1 mm and 2.5 mm.

The second elastomeric material can also comprise at least one additional reinforcing filler commonly used in rubber mixtures for pneumatic tires, such as carbon black and/or silica, in quantities generally between 5 and 80 phr, preferably between 10 and 50 phr.

In a preferred embodiment of the invention, the tread band is provided with a plurality of transversal and/or longitudinal grooves defined in respective portions of the tread band substantially consisting of the second elastomeric material.

The arrangement and the number of the transversal and/or longitudinal grooves and of the portions substantially consisting of the second elastomeric material in which they are formed can be easily determined by the man skilled in the art according to specific application requirements. Thus, for example, the transversal and/or longitudinal grooves may or may not be circumferentially or axially spaced apart from each other with a constant pitch between them according to the characteristics that one wishes to give to the tread pattern.

In a preferred embodiment of the invention, the aforementioned at least one portion of tread band substantially consisting of the second elastomeric material is shaped in this way as to form a lining surrounding said at least one groove.

In this way, it is advantageously possible to obtain the desired technical effect of increasing the stiffness characteristics of the side walls of the grooves using a reduced amount of the second elastomeric material, which can be extruded in the form of a relatively thin layer simultaneously with the first elastomeric material constituting the rest of the tread band during the preparation of the tread band and before the formation of the grooves in the molding and vulcanization step of the pneumatic tire.

Preferably, such a lining has a thickness comprised between 1 and 10 mm.

In a preferred embodiment of the invention, the tread band is of the type provided with axially adjacent sectors and comprises:

i) at least one first sector, radially extending, and substantially consisting of the second elastomeric material;
ii) a plurality of second sectors, radially extending, and positioned at axially opposite sides of said at least one first sector, said second sectors substantially consisting of the first elastomeric material; and
wherein said at least one groove is formed in said at least one first sector.

In this way, it is advantageously possible to obtain the desired technical effect of increasing the stiffness characteristics of the side walls of the grooves using axially adjacent sectors that can be obtained by simultaneous extrusion of the first and of the second elastomeric materials and having differing characteristics of stiffness and hardness under heat.

In this embodiment, said at least one groove is preferably a longitudinal groove extending substantially for the entire circumferential development of the tread band.

In the embodiment of the tread band with axially adjacent sectors, the aforementioned at least one longitudinal groove is therefore formed in the aforementioned at least one first sector consisting of the second elastomeric material.

Still more preferably, the tread band is provided with a plurality of longitudinal grooves formed in respective first sectors of the tread band consisting of the second elastomeric material, radially extending and axially spaced apart from each other.

In this way, it is possible to provide a tread band capable to display the desired water draining characteristics from the ground contacting area of the pneumatic tire by arranging a suitable number of longitudinal grooves axially spaced apart from each other.

In a preferred embodiment of the invention, the aforementioned at least one first sector is radially extending substantially for the entire thickness of the tread band, so as to achieve the desired technical effect of keeping the transversal stiffness characteristics of the grooves substantially for the whole useful life of the pneumatic tire.

In a preferred alternative embodiment of the invention, the pneumatic tire may be additionally provided with a layer of a suitable elastomeric material interposed between the tread band and the belt structure.

In this way, it is advantageously possible—if desired—to optimize specific characteristics of the pneumatic tire such as transversal stiffness or the rolling resistance.

Within the framework of this embodiment of the invention, this layer is preferably substantially consisting of the second elastomeric material.

In this way, it is advantageously possible to further increase the stiffness characteristics and the characteristics of resistance to deformation of the tread band portions defined between consecutive grooves thanks to the supporting action carried out by this additional layer.

Preferably, the layer interposed between the tread band and the belt structure has a thickness comprised between 1 and 5 mm so as to fully achieve the aforementioned technical effects.

In a preferred embodiment, the width of the aforementioned at least one first radially extending sector is at least equal to the width of the longitudinal groove formed therein. In this way, it is advantageously possible to achieve the desired technical effect of limiting as much as possible the deformation of the portions of tread band (ribs or blocks) defined between axially consecutive grooves.

Preferably, the difference between the width of said at least one first radial sector and the width of said at least one longitudinal groove is comprised between 4 and 10 mm. In this way, it is advantageously possible to have, on both sides of the groove, a quantity of the second elastomeric material more than adequate to avoid undesired deformations of the side walls of the grooves when the pneumatic tire is subjected to drift stresses.

In a preferred embodiment, the axially opposite side walls of the longitudinal groove(s) formed in the first sectors of the tread band are tapered along a radially inner direction and are substantially rectilinear.

Preferably, moreover, the aforementioned at least one longitudinal groove is positioned astride the median plane of the respective radially extending first sector for reasons of symmetry and so as to achieve substantially the same stiffness characteristics of the axially opposite side walls of the groove itself.

BRIEF DESCRIPTION OF THE DRAWINGS

Additional features and advantages of the invention will be better apparent from the following description of some preferred embodiments of pneumatic tires according to the invention, made by way of non limiting indication, with reference to the attached drawings, wherein.

DETAILED DESCRIPTION OF THE PREFERRED EMBODIMENTS

Figure 1:
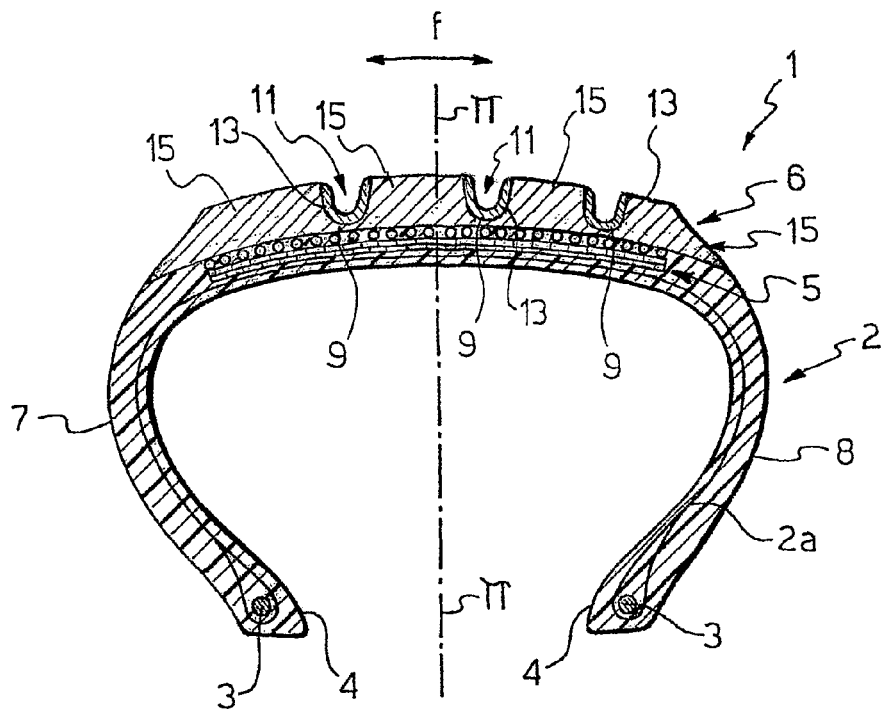
FIG. 1 shows a cross-section view of a first embodiment of a pneumatic tire according to the present invention.
Figure 2:
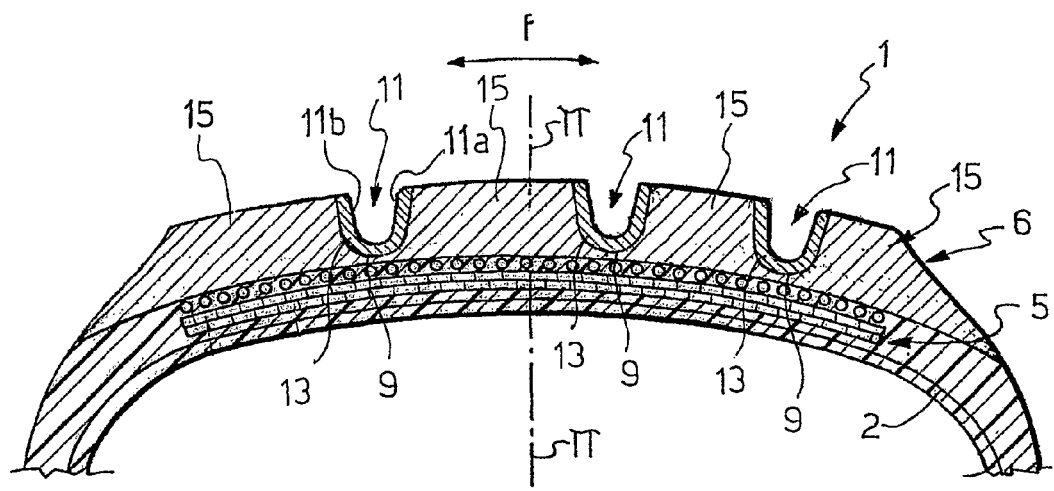
FIG. 2 shows an enlarged scale cross-section view of some details of the pneumatic tire of FIG. 1.

With reference to FIGS. 1-2, a pneumatic tire made according to a first preferred embodiment of the invention, which in the specific example is a tire of the so-called UHP type intended to equip a motorvehicle, is generally indicated at 1.

The pneumatic tire 1 comprises a carcass structure 2 provided with at least one carcass ply 2a the opposite side edges of which are externally folded up around respective annular reinforcing structures 3, usually known as "bead cores", each enclosed in a bead 4 defined along an inner circumferential edge of the pneumatic tire 1 and at which the pneumatic tire itself engages on a rim (not illustrated) forming part of the wheel of a vehicle.

The pneumatic tire 1 also comprises a tread band 6 made of an elastomeric material at a radially outer position with respect to the carcass structure 2, a belt structure 5 interposed between the carcass structure 2 and the tread band 6 and a pair of sidewalls 7, 8 at axially opposite positions on the carcass structure 2.

Preferably, the belt structure 5 includes one or more belt layers made for example with a fabric of metal cords or wires embedded in a rubber sheet, arranged parallel to each other in each layer and crossed with respect to those of the adjacent layer and with one or more so-called 0° cords spirally and coaxially wound on the pneumatic tire 1 at a radially outer position with respect to the crossed cord fabrics.

The tread band 6 circumferentially applied around the belt structure 5 generally consists of a first elastomeric material incorporating at least one portion 9, preferably a plurality of portions 9, substantially consisting of a second elastomeric material.

According to the embodiment illustrated in FIG. 1, the tread band 6 thus made is provided with a radially outer surface 6a adapted for a rolling contact with the ground and is also provided with a tread pattern comprising a plurality of longitudinal grooves 11 for draining water or mud from the ground contacting area of the pneumatic tire 1.

The longitudinal grooves 11 define a plurality of portions of the tread band 6 in the form of ribs and/or blocks schematically indicated at 15 in FIG. 1.

Each longitudinal groove 11 is in turn provided with a pair of axially opposite side walls 11a, 11b preferably tapered along the radially inner direction.

Preferably, the side walls 11a, 11b of the longitudinal grooves 11 are also substantially rectilinear.

According to the embodiment illustrated in FIG. 1, the longitudinal grooves 11 are defined in the portion 9 of the tread band 6 substantially consisting of the second elastomeric material.

According to as many features of the invention, the ratio between the modulus of elasticity E' under compression at 100° C. of the second elastomeric material and the modulus of elasticity E' under compression at 100° C. of the first elastomeric material is not lower than about 1.30; whereas the ratio between the IRHD hardness at 100° C. of the second elastomeric material, measured in accordance with standard ISO 48, and the IRHD hardness at 100° C. of the first elastomeric material, measured in accordance with standard ISO 48, is lower than about 1.10.

In this way, it is advantageously possible to stiffen the side walls 11a, 11b of the grooves 11 in a specific and localized manner allowing them, and the portions 15 of the tread band 6 defined between consecutive grooves, to deform in a substantially reduced manner as a consequence of the transversal stresses which the portions 15 are subjected to when the pneumatic tire 1 is drifting, stresses which are schematically indicated by the arrow f in FIGS. 1 and 2.

The portions 9 consisting of the second elastomeric material which surround the side walls 11a, 11b of the grooves 11, mechanically more rigid, are in fact able to effectively oppose the deforming action of the shear stresses which the portions 15 of elastomeric material defined between successive grooves (in the form of ribs and/or blocks) along the axial direction are subjected to when cornering. It ensues an advantageous increase of the road holding and handling characteristics of the pneumatic tire 1.

According to the embodiment illustrated in FIG. 1, the aforementioned portions 9 substantially consisting of the second elastomeric material are shaped in this way as to form a lining 13 surrounding the longitudinal grooves 11.

Preferably, the lining 13 has a thickness comprised between 1 and 10 mm.

It should be noted that in this preferred embodiment of the pneumatic tire 1, the portions 15 of the tread band 6 defined between the longitudinal grooves 11 are of the composite type, i.e. they comprise two different elastomeric materials which together define the radially outer surface 6a of the tread band 6 adapted to get in touch with the ground.

Preferably, the ratio between the modulus of elasticity E' under compression at 100° C. of the second elastomeric material and the modulus of elasticity E' under compression at 100° C. of the first elastomeric material is comprised between about 1.30 and about 1.50.

In order to achieve the aforementioned ratios of the moduli of elasticity under heat, the modulus of elasticity E' under compression at 100° C. of said first elastomeric material is preferably comprised between about 4 and about 8 MPa, whereas the modulus of elasticity E' under compression at 100° C. of said second elastomeric material is preferably comprised between about 6 and about 12 MPa.

Preferably, the ratio between the IRHD hardness at 100° C. of the second elastomeric material, measured in accordance with standard ISO 48, and the IRHD hardness at 100° C. of the first elastomeric material, measured in accordance with standard ISO 48, is comprised between about 1 and about 1.05.

In this way, it is advantageously possible to achieve the aforementioned improved characteristics of road holding of the pneumatic tire 1 without substantially penalizing the wear characteristics of the tread band 6.

In order to achieve the aforementioned ratios of hardness under heat, the IRHD hardness at 100° C. of the first and second elastomeric materials, measured in accordance with standard ISO 48, is preferably comprised between about 50 and about 70.

Preferably, the ratio between the Mooney viscosity ML (1+4) at 100° C. of the second unvulcanized elastomeric material, measured in accordance with standard ASTM D5289, and the Mooney viscosity ML (1+4) at 100° C. of the first unvulcanized elastomeric material, measured in accordance with standard ASTM D5289, is comprised between about 1 and about 1.10.

In this way, it is advantageously possible to coextrude the two elastomeric materials which constitute the tread band 6 without having rheological problems.

In order to achieve the aforementioned ratios of viscosity under heat, the Mooney viscosity ML (1+4) at 100° C. of the first and second unvulcanized elastomeric materials, measured in accordance with standard ASTM D5289, is comprised between about 50 and about 60.

Preferably, the second elastomeric material which constitutes the lining 13 of the grooves 11 comprises at least one diene elastomeric polymer reinforced with at least one reinforcing material selected from layered inorganic materials, short fibrillated fibers of polyamide materials and mixtures thereof, dispersed in the diene elastomeric polymer.

In a particularly preferred embodiment, the first and second elastomeric materials comprise diene elastomeric polymers having substantially the same mechanical characteristics and, more preferably, the same diene elastomeric polymers.

In this case, a single diene elastomeric polymer can advantageously be used to make the two elastomeric materials which constitute the tread band 6, differentiating in the desired manner their mechanical characteristics thanks to the incorporation in the second elastomeric material of the aforementioned reinforcing material selected from layered inorganic materials, short fibrillated fibers of polyamide materials and mixtures thereof.

Whenever at least one layered inorganic material is used as reinforcing material, it is preferable and advantageous that this material has an individual layer thickness comprised between 0.01 nm and 30 nm and that this material is incorporated in the second elastomeric material in an amount between about 1 and about 80 parts by weight, preferably between about 5 and about 40 parts by weight, per 100 parts by weight of diene elastomeric polymer.

Whenever short fibrillated fibers of polyamide materials are used as reinforcing material, it is preferable and advantageous that this material is incorporated in the second elastomeric material in an amount between about 1 and about 80 parts by weight per 100 parts by weight of diene elastomeric polymer, preferably between about 5 and about 40 parts by weight, per 100 parts by weight of diene elastomeric polymer.

The second elastomeric material can also comprise at least one additional reinforcing filler commonly used in rubber mixtures for pneumatic tires, such as carbon black and/or silica, in amounts generally between 5 and 80 phr, preferably between 10 and 50 phr.

In FIGS. 3-6A two additional preferred embodiments of the pneumatic tire 1 of the invention are shown.

In the following description and in such figures, the elements of the pneumatic tire 1 which are structurally or functionally equivalent to those previously illustrated with reference to the embodiment shown in FIGS. 1 and 2 will be indicated with the same reference numerals and will not be described any further.

In the embodiment illustrated in FIGS. 3-6A, the portions 9 of the tread band 6 which are substantially consisting of the second elastomeric material described above form a plurality of first sectors axially spaced apart from each other and radially extending in the tread band.

In this embodiment, the tread band 6 also comprises a plurality of second sectors 10 axially spaced apart from each other and also radially extending from axially opposite sides of the first sectors 9. The second sectors 10 substantially consist of the first elastomeric material described above.

In this preferred embodiment, the grooves 11 are longitudinal grooves and are formed in the first sectors 9 substantially for the entire circumferential development of the tread band 6.

Preferably, the first and second sectors 9, 10 of the tread band 6 are radially extending substantially for the entire thickness of the tread band itself, also in this case achieving substantially the same overall technical effects of the pneumatic tire 1 illustrated in FIGS. 1 and 2.

Preferably the longitudinal grooves 11 are positioned astride the median plane m of the first sectors 9.

Preferably, the difference between the width of the first radial sectors 9 and the width of the longitudinal grooves 11 is comprised between 4 and 10 mm, so as to have, on both sides of the groove 11, a quantity of the second elastomeric material more than adequate to avoid undesired deformations of the side walls 11a, 11b of the longitudinal grooves 11 under the ground contacting area of the pneumatic tire 1 when the tread band 6 is subjected to shear stresses.

In this way, the first and second axially adjacent sectors 9, 10 of the tread band 6 advantageously allow, thanks to their different mechanical characteristics, to reduce to a minimum the deformations along a transversal direction of the portions 15 of the tread band 6 (in the form of ribs and/or blocks) defined between the longitudinal grooves 11 when the tread band 6 is stressed along the transversal direction according to the arrow f along a bend or in mixed paths.

Advantageously, this feature thus allows to achieve improved characteristics of road holding and handling of the pneumatic tire 1 when drifting with respect to those that it is possible to achieve with pneumatic tires provided with a tread band of the known type.

For the purposes of the invention, the shape of the first and second sectors 9, 10 of the tread band 6 is not critical and can advantageously be selected by a man skilled in the art according to specific application requirements. Thus, for example, such sectors can have a substantially rectangular or, alternatively, a substantially trapezoidal cross section.

Equally not critical for the purposes of the invention is the shape of the axially opposite side walls 9a, 9b and 10a, 10b of the first and second sectors 9, 10 of the tread band 6. Such walls can, for example, be substantially rectilinear or, alternatively, can be provided with at least one substantially curvilinear portion.

Also among these different possible configurations, the man skilled in the art can easily select the most appropriate or the most advantageous one according to the production methods adopted for manufacturing the tread band 6.

The first and second sectors 9, 10 are also alternatively axially distributed according to the positioning requirements of the longitudinal grooves 11 with a pitch p that can be variable or constant along the transversal development of the tread band 6.

Although the pneumatic tire 1 of this preferred embodiment has been illustrated with just one layer including the first and second axially adjacent sectors 9, 10, this does not exclude that the tread band 6 can comprise two or more radially overlapping layers in order to satisfy specific and contingent application requirements.

Figure 3:
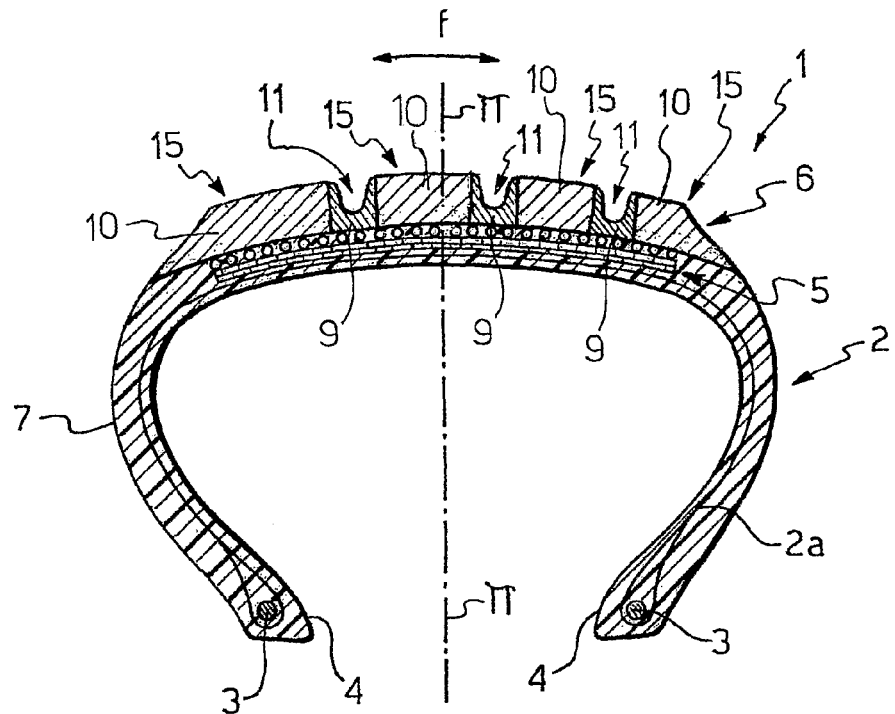
FIG. 3 shows a cross-section view of a second embodiment of a pneumatic tire according to the present invention provided with a plurality of axially adjacent sectors.
Figure 4:
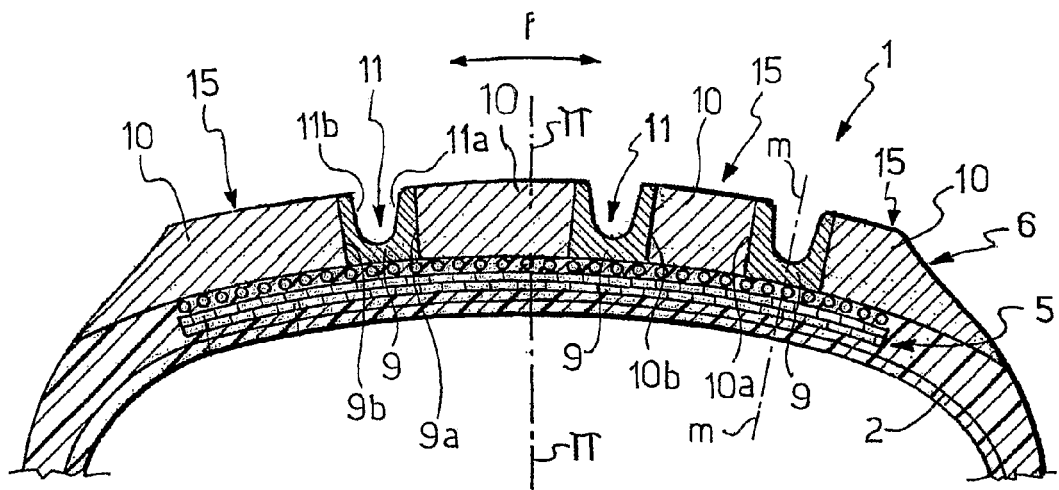
FIG. 4 shows an enlarged scale cross-section view of some details of the pneumatic tire of FIG. 3.

Moreover, the number and size of the transversal development of the first and second sectors 9, 10 of the tread band 6 can be different from those exemplified for illustrative and not limiting purposes in FIGS. 3 and 4 and can be easily determined by the man skilled in the art according to specific application requirements of the pneumatic tire 1.

Figure 5:
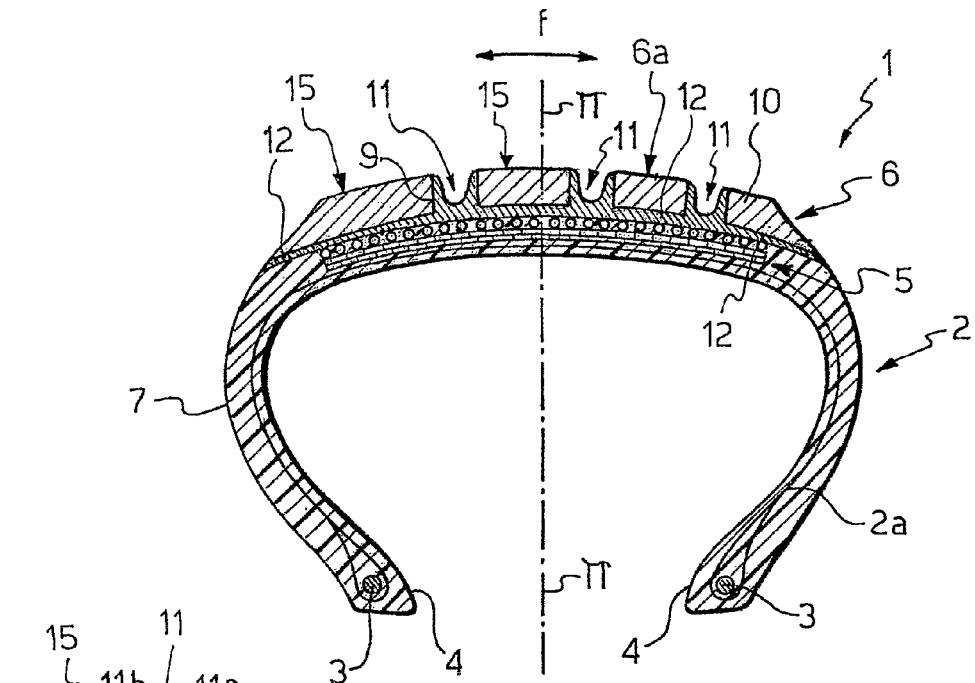
FIG. 5 shows a cross-section view of a third embodiment of a pneumatic tire according to the present invention provided with a plurality of axially adjacent sectors.
Figure 6A:
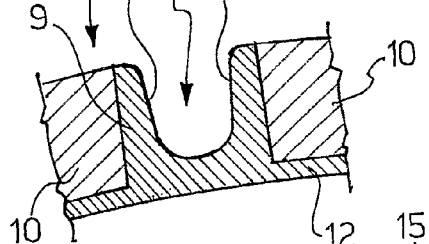
FIG. 6A shows an further enlarged scale cross-section view of a radially extending sector and of a longitudinal groove formed therein of the tread band of the pneumatic tire of FIG. 5.
Figure 6:
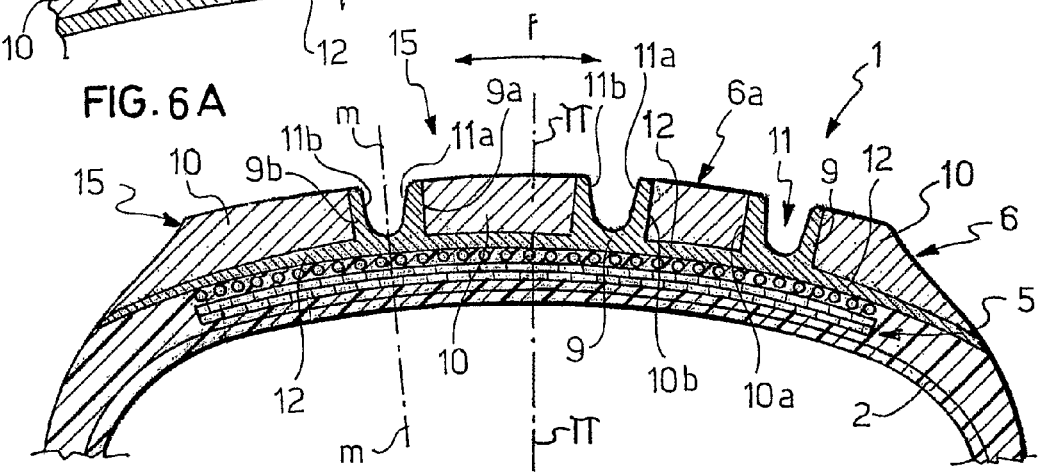
FIG. 6 shows an enlarged scale cross-section view of some details of the pneumatic tire of FIG. 5.

In the preferred embodiment illustrated in FIGS. 5, 6 and 6A, the first sectors 9 of the tread band 6 are radially extending along an outer direction starting from a layer 12 interposed between the tread band 6 and the belt structure 5.

Preferably, the layer 12 has a thickness comprised between 1 and 5 mm.

More preferably, the layer 12 substantially consists of the second elastomeric material and the first sectors 9 are integrally extending from such a layer along a radially outer direction. In this way, the layer 12 carries out an advantageous supporting action of the first sectors 9 further increasing the characteristics of stiffness and resistance to deformation.

Also in this case, substantially the same overall technical effects of the pneumatic tire 1 illustrated in FIGS. 1-4 are achieved.

Although the grooves 11 illustrated in the preferred embodiments illustrated in FIGS. 1-6 are longitudinal grooves, the pneumatic tire 1 of the invention can equally be provided with one or more transversal grooves formed at respective portions of the tread band 6 essentially consisting of the second elastomeric material.

In such a case, the pneumatic tire 1 also achieves improved characteristics of road holding and reduced degradation of the elastomeric materials constituting the tread band 6, even during acceleration and braking, i.e. when the stresses imparted to the tread band are directed substantially along the circumferential direction.

In the following example, provided purely for indicating and not limiting purposes, some formulations of preferred elastomeric materials which can be used for making the tread band 6 of a pneumatic tire according to the invention shall now be indicated.

Example 1

Elastomeric materials have been prepared, designated with A and B in the following Table 1, which can be used for making the first and second elastomeric material of the tread band 6, respectively. In Table 1, all of the amounts are expressed in phr.

TABLE 1

| Ingredients | material A (first elastomeric material) | material B (second elastomeric material) |
|---|---|---|
| S-SBR | 100 | 100 |
| carbon black N234 | 45 | 45 |
| SiO$_2$ | 25 | 25 |
| SiO$_2$ binding agent | 2 | 2 |
| reinforcing material | — | 10 |
| aromatic oil | 9 | 9 |
| microcrystalline wax | 1 | 1 |
| stearic acid | 1.5 | 1.5 |
| ZnO | 2 | 2 |
| Antioxidant | 2.5 | 2.5 |
| TBBS | 2.4 | 2.4 |
| soluble sulfur | 1 | 1 |

The ingredients used were the following:
S—SBR=butadiene-styrene copolymer oil prepared in solution commercially available with the trade name JSR;
carbon black N234=a product available on the market with the trade name of VULCAN® 7H (CABOT CORPORATION);
SiO$_2$=silica available on the market with the trade name of ULTRASIL® VN3 (DEGUSSA);
SiO$_2$ binding agent=solid composition including 50% carbon black (N330), 50% bis(3-triethoxysilyl-propyl)tetrasulfide commercially available with the trade name of X50S® (DEGUSSA);
reinforcing material=montmorillonite modified with ammonium salts commercially available with the trade name of Dellite® 67G (Laviosa Chimica Mineraria S.p.A.);
microcrystalline wax;
aromatic oil=a product available on the market with the trade name of MOBILOIL® 90 (MOBIL);
stearic acid=a product available on the market with the trade name of STEARINA® TP8 (MIRACHEM);
ZnO=a product available on the market with the trade name of ZINKOXYD AKTIV® (BAYER);
antioxidant=diphenylguanidine or DPG, commercially available with the trade name of VULKACIT® D (BAYER);
TBBS=N-t-butyl-2-benzothiazyl-sulfenamide, available on the market with the trade name of VULKACIT® NZ (BAYER);
soluble sulfur=a product available on the market with the trade name of RUBERSUL® 400 (REPSOL DERIVADOS).

According to conventional techniques known in the art, the aforementioned elastomeric materials were subjected to vulcanization and then to a series of tests having the purpose of measuring some typical parameters of the materials before and after vulcanization. The parameters taken into consideration were the following:
E'100° C.=modulus of elasticity under compression measured at 100° C. according to the procedure reported hereinabove;
Tan δ 100° C.=ratio between the loss modulus E" and the modulus of elasticity E' measured at 100° C. according to the procedure reported hereinabove;
IRHD hardness=measured at 100° C. in accordance with standard ISO 48;
ML (1+4)=Mooney viscosity of the unvulcanized elastomeric material measured at 100° C. in accordance with standard ASTM D5289.

The results of the tests carried out are shown in the following Table 2.

TABLE 2

| Parameter | material A (first elastomeric material) | material B (second elastomeric material) |
|---|---|---|
| IRHD hardness | 60 | 61 |
| E' 100° C. [MPa] | 5.5 | 7.4 |
| Tanδ 100° C. | 0.14 | 0.15 |
| ML(1 + 4) | 55 | 55.4 |

Example 2

Road Behavior

Using the elastomeric materials obtained according to the previous example 1 a series of tread bands were produced by drawing, in conventional apparatuses known per se, which tread bands were then used to manufacture pneumatic tires of size 225/40 ZR18 and 265/35 ZR18 shaped according to what is illustrated in FIGS. 1 and 2.

The pneumatic tires thus obtained were then subjected to a series of standard tests in order to evaluate the road behavior thereof at the testing track located in Imola by mounting the pneumatic tires on a Porsche model 911.

In the tests carried out, the performances of the pneumatic tires obtained from the mixture of the previous Example 1 were compared with those given by conventional comparative pneumatic tires of the same size and having the same tread pattern.

The pneumatic tires were tested by a pair of independent drivers on a predetermined number of laps carried out as fast as possible. During the test each driver evaluated the maximum number of laps completed without perceiving a degradation of the road holding and handling performance.

The results obtained, expressed as an average of the values obtained in five tests of the evaluations expressed by two different drivers and normalizing, with an index 100, the number of laps completed without perceiving a degradation of the road holding performance in the case of the conventional pneumatic tires, are shown in the following Table 5.

TABLE 5

| Parameter | Comparative pneumatic tire | Pneumatic tire according to the invention |
|---|---|---|
| handling | 100 | 200 |

From the tests carried out, the pneumatic tire of the invention achieved, thanks to the greater thermal-mechanical stability of its tread band, a performance twice as much as that of the comparative pneumatic tire (without lining of the grooves).

The pneumatic tire of the invention thus allows to achieve the following advantageous technical effects:
1. reduction of the state of deformation of the tread pattern;
2. thermal and mechanical stability of the elastomeric materials which constitute the tread band;
3. better handling performances of the pneumatic tire, in particular when drifting, accelerating or braking according to the arrangement of the grooves (longitudinal rather than transversal);
4. operating stability of the aforementioned performances.

The invention claimed is:

1. A pneumatic tire comprising:
a carcass structure having at least one carcass ply and at least one annular reinforcing structure associated with said carcass ply;
a pair of axially opposite side walls on said carcass structure;
a belt structure arranged at a radially outer position with respect to said carcass structure; and
a tread band arranged at a radially outer position with respect to said belt structure and generally comprising a first elastomeric material incorporating at least one portion substantially of a second elastomeric material,
wherein the tread band comprises at least one groove defined in said at least one portion substantially of the second elastomeric material;
wherein the ratio between the modulus of elasticity under compression at 100° C. of the second elastomeric material and the modulus of elasticity under compression at 100° C. of the first elastomeric material is not lower than 1.30; and
wherein the ratio between the IRHD hardness at 100° C. of the second elastomeric material, measured in accordance with standard ISO 48, and the IRHD hardness at 100° C. of the first elastomeric material, measured in accordance with standard ISO 48, is lower than 1.10.

2. The pneumatic tire according to claim 1, wherein the ratio between the modulus of elasticity under compression at 100° C. of the second elastomeric material and the modulus of elasticity under compression at 100° C. of the first elastomeric material is 1.30 to 1.50.

3. The pneumatic tire according to claim 1, wherein the modulus of elasticity under compression at 100° C. of said first elastomeric material is 4 to 8 MPa.

4. The pneumatic tire according to claim 1, wherein the modulus of elasticity under compression at 100° C. of said second elastomeric material is 6 to 12 MPa.

5. The pneumatic tire according to claim 1, wherein the ratio between the IRHD hardness at 100° C. of the second elastomeric material, measured in accordance with standard ISO 48, and the IRHD hardness at 100° C. of the first elastomeric material, measured in accordance with standard ISO 48, is 1 to 1.05.

6. The pneumatic tire according to claim 1, wherein the IRHD hardness at 100° C. of the first elastomeric material, measured in accordance with standard ISO 48, is 50 to 70.

7. The pneumatic tire according to claim 1, wherein the IRHD hardness at 100° C. of the second elastomeric material, measured in accordance with standard ISO 48, is 50 to 70.

8. The pneumatic tire according to claim 1, wherein the ratio between the Mooney viscosity ML (1+4) at 100° C. of the second unvulcanized elastomeric material, measured in accordance with standard ASTM D5289, and the Mooney viscosity ML (1+4) at 100° C. of the first unvulcanized elastomeric material, measured in accordance with standard ASTM D5289, is 1 to 1.10.

9. The pneumatic tire according to claim 1, wherein the Mooney viscosity ML (1+4) at 100° C. of the first unvulcanized elastomeric material, measured in accordance with standard ASTM D5289, is 50 to 60.

10. The pneumatic tire according to claim 1, wherein the Mooney viscosity ML (1+4) at 100° C. of the second elastomeric material, measured in accordance with standard ASTM D5289, is 50 to 60.

11. The pneumatic tire according to claim 1, wherein said second elastomeric material comprises at least one diene elastomeric polymer reinforced with at least one reinforcing material selected from layered inorganic materials, short fibrillated fibers of polyamide materials and mixtures thereof, said at least one reinforcing material being dispersed in said diene elastomeric polymer.

12. The pneumatic tire according to claim 11, wherein said first and second elastomeric materials comprise respective diene elastomeric polymers having substantially the same mechanical characteristics.

13. The pneumatic tire according to claim 11, wherein at least one layered inorganic material has an individual layer thickness of 0.01 nm to 30 nm.

14. The pneumatic tire according to claim 11, wherein said second elastomeric material comprises 1 to 80 parts by weight of said at least one layered inorganic material per 100 parts by weight of diene elastomeric polymer.

15. The pneumatic tire according to claim 14, wherein said second elastomeric material comprises 5 to 40 parts by weight of said at least one layered inorganic material per 100 parts by weight of diene elastomeric polymer.

16. The pneumatic tire according to claim 11, wherein said second elastomeric material comprises 1 to 80 parts by weight of said short fibrillated fibers per 100 parts by weight of diene elastomeric polymer.

17. The pneumatic tire according to claim 16, wherein said second elastomeric material comprises 5 to 40 parts by weight of said short fibrillated fibers per 100 parts by weight of diene elastomeric polymer.

18. The pneumatic tire according to claim 11, wherein said second elastomeric material comprises at least one additional reinforcing filler, in an amount of 5 to 80 phr.

19. The pneumatic tire according to claim 18, wherein said additional reinforcing filler is in an amount of 10 to 50 phr.

20. The pneumatic tire according to claim 18, wherein said additional reinforcing filler is carbon black.

21. The pneumatic tire according to claim 18, wherein said additional reinforcing filler is silica.

22. The pneumatic tire according to claim 1, wherein the tread band is provided with a plurality of transversal and/or longitudinal grooves defined at respective portions of the tread band substantially of the second elastomeric material.

23. The pneumatic tire according to claim 1, wherein said at least one portion of the tread band substantially of the second elastomeric material is shaped in a way so as to form a lining surrounding said at least one groove.

24. The pneumatic tire according to claim 23, wherein said lining has a thickness of 1 to 10 mm.

25. The pneumatic tire according to claim 1, wherein the tread band comprises:
   i) at least one radially extending first sector substantially of said second elastomeric material; and
   ii) a plurality of radially extending second sectors positioned at axially opposite sides of said at least one first sector, said second sectors being substantially of said first elastomeric material,
   wherein said at least one groove is formed in said at least one first sector.

26. The pneumatic tire according to claim 1, wherein said at least one groove is a longitudinal groove extending substantially the entire circumferential development of the tread band.

27. The pneumatic tire according to claim 26, wherein the tread band is provided with a plurality of longitudinal grooves and wherein said grooves are formed in respective first sectors of the tread band radially extending and axially spaced apart from each other.

28. The pneumatic tire according to claim 25, wherein said at least one first sector radially extends substantially for the entire thickness of the tread band.

29. The pneumatic tire according to claim 1, wherein a layer of elastomeric material is interposed between said tread band and said belt structure.

30. The pneumatic tire according to claim 29, wherein said layer is substantially consisting of said second elastomeric material.

31. The pneumatic tire according to claim 29, wherein said layer has a thickness of 1 to 5 mm.

32. The pneumatic tire according to claim 25, wherein the width of said at least one first sector is at least equal to the width of said at least one groove.

33. The pneumatic tire according to claim 32, wherein the difference between the width of said at least one first sector and the width of said at least one groove is 4 to 10 mm.

34. The pneumatic tire according to claim 25, wherein said at least one groove is positioned astride the median plane of said at least one first sector.

* * * * *